US008240385B2

(12) United States Patent
Brothers et al.

(10) Patent No.: US 8,240,385 B2
(45) Date of Patent: *Aug. 14, 2012

(54) LOW HEAT OF HYDRATION CEMENT COMPOSITIONS AND METHODS OF USING SAME

(75) Inventors: Lance E. Brothers, Chickasha, OK (US); Anthony V. Palmer, Ardmore, OK (US)

(73) Assignee: Halliburton Energy Services Inc., Duncan, OK (US)

(*) Notice: Subject to any disclaimer, the term of this patent is extended or adjusted under 35 U.S.C. 154(b) by 768 days.

This patent is subject to a terminal disclaimer.

(21) Appl. No.: 11/385,426

(22) Filed: Mar. 21, 2006

(65) Prior Publication Data

US 2007/0221379 A1 Sep. 27, 2007

(51) Int. Cl.
E21B 33/13 (2006.01)
(52) U.S. Cl. ........................................................ 166/293
(58) Field of Classification Search .................. None
See application file for complete search history.

(56) References Cited

U.S. PATENT DOCUMENTS

| | | | |
|---|---|---|---|
| 3,179,528 A | 4/1965 | Holmgren et al. | |
| 3,582,376 A | 6/1971 | Ames | |
| 3,891,454 A * | 6/1975 | Cunningham et al. | 106/719 |
| 3,937,282 A * | 2/1976 | Shryock et al. | 166/293 |
| 4,054,461 A * | 10/1977 | Martin | 106/717 |
| 4,257,483 A * | 3/1981 | Morris et al. | 166/292 |
| 4,302,251 A | 11/1981 | Udagawa et al. | |
| 4,482,379 A * | 11/1984 | Dibrell et al. | 106/609 |
| 4,761,183 A | 8/1988 | Clarke | |
| 5,346,550 A | 9/1994 | Kunzi et al. | |
| 5,361,842 A | 11/1994 | Hale et al. | |
| 5,409,071 A * | 4/1995 | Wellington et al. | 166/253.1 |
| 5,447,198 A | 9/1995 | Kunzi et al. | |
| 5,547,505 A * | 8/1996 | Nakatsu et al. | 106/713 |
| 5,569,324 A * | 10/1996 | Totten et al. | 106/696 |
| 5,580,379 A | 12/1996 | Cowan | |
| 5,588,489 A | 12/1996 | Chatterji et al. | |
| 5,685,903 A | 11/1997 | Stav et al. | |
| 5,696,059 A * | 12/1997 | Onan et al. | 507/269 |
| 5,718,759 A | 2/1998 | Stav et al. | |
| 5,858,083 A | 1/1999 | Stav et al. | |
| 5,913,364 A | 6/1999 | Sweatman | |
| 6,060,434 A | 5/2000 | Sweatman et al. | |
| 6,068,055 A | 5/2000 | Chatterji et al. | |
| 6,167,967 B1 | 1/2001 | Sweatman | |
| 6,231,664 B1 | 5/2001 | Chatterji et al. | |
| 6,258,757 B1 | 7/2001 | Sweatman et al. | |
| 6,263,987 B1 * | 7/2001 | Vail, III | 175/318 |
| 6,521,039 B2 | 2/2003 | Stroup et al. | |
| 6,561,273 B2 | 5/2003 | Brothers et al. | |
| 6,562,122 B2 | 5/2003 | Dao et al. | |
| 6,689,208 B1 * | 2/2004 | Brothers | 106/794 |
| 6,776,237 B2 | 8/2004 | Dao et al. | |
| 6,904,971 B2 | 6/2005 | Brothers et al. | |
| 6,908,508 B2 | 6/2005 | Brothers | |
| 7,077,203 B1 | 7/2006 | Roddy et al. | |
| 2005/0056191 A1 * | 3/2005 | Brothers et al. | 106/811 |
| 2005/0109507 A1 * | 5/2005 | Heathman et al. | 166/292 |
| 2006/0020145 A1 * | 1/2006 | Lal et al. | 562/18 |
| 2006/0065399 A1 * | 3/2006 | Luke et al. | 166/293 |
| 2006/0144593 A1 | 7/2006 | Reddy | |
| 2006/0201711 A1 * | 9/2006 | Vail, III | 175/57 |
| 2007/0221378 A1 | 9/2007 | Brothers et al. | |

FOREIGN PATENT DOCUMENTS

SU 1021665 A 6/1983
WO WO 92/06048 4/1992

OTHER PUBLICATIONS

"Gas Hydrate" Schlumberger Oilfield Glossary.*
Halliburton brochure entitled "Cal-Seal 60 Cement Accelerator" dated 1999.
Halliburton brochure entitled "Permafrost® E Cement" dated 1999.
Cunningham, W. et al., "Cement Through Permafrost Environment" dated 1977, ASME 77-Pet-37.
Halliburton paper entitled "Cement Blends Can Be Tested for Arctic Environments" dated 1977.
American Petroleum Institute, Twenty-Second Edition, Dec. 1997, "Recommended Practice for Testing Wel Cements", section 7, 9, and 12.
Schofield, TR et al., "Stabilization of In-situ Hydrated Enhances Drilling Performance and Rig Safety" dated 1997, SPE 38568.
Office Action dated Mar. 20, 2007 (10 pages), U.S. Appl. No. 11/385,416, filed Mar. 21, 2006.
Notice of Allowance and Fees Due dated Sep. 17, 2007 (6 pages), U.S. Appl. No. 11/385,416, filed Mar. 21, 2006.
United States Gypsum Company, Material Safety Data Sheet, Ultracal® 30 Gypsum Cement, Oct. 1, 1999, pp. 1-4, MSDS No. 05350, Version 3, Chicago, IL.
Corrected Notice of Allowance dated Jan. 29, 2008 (11 pages), U.S. Appl. No. 11/385,416, filed Mar. 21, 2006.
Foreign Communication from a related counterpart application—International Search Report and Written Opinion, PCT/GB2007/001021, Nov. 2, 2007, 13 pages.
Smart, Roderick MacDonald, "Settable compositions and their use in anchoring of elements," XP000152276, Chemical Abstracts, Apr. 30, 1990, 13 pages, vol. 112, No. 18.
Foreign Communication from a related counterpart application—Canadian Office Action, CA 2,645,920, Oct. 14, 2010, 3 pages.

* cited by examiner

*Primary Examiner* — Angela M DiTrani
(74) *Attorney, Agent, or Firm* — Craig W. Roddy; Conley Rose, P.C.

(57) ABSTRACT

A method of servicing a wellbore in a subterranean formation, comprising preparing a cement composition comprising water and a cementitious material, wherein the cementitious material further comprises blast furnace slag, vitrified shale, calcium sulfate hemi-hydrate or combinations thereof, and placing the cement composition in the wellbore. A cement composition comprising water and a cementitious material, wherein the cementitious material further comprises blast furnace slag, vitrified shale, calcium sulfate hemi-hydrate or combinations thereof. A cement composition comprising water and a cementitious material, wherein the cementitious material further comprises blast furnace slag.

14 Claims, No Drawings

LOW HEAT OF HYDRATION CEMENT COMPOSITIONS AND METHODS OF USING SAME

CROSS-REFERENCE TO RELATED APPLICATIONS

The subject matter of the present application is related to U.S. patent application Ser. No. 11/385,416 filed on Mar. 21, 2006 and entitled "Cements for Use across Formations Containing Gas Hydrates," which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

1. Field of the Invention

This invention relates to servicing a wellbore. More specifically, it relates to servicing a wellbore with cement compositions having a low heat of hydration.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

The completion of subterranean wellbores in fragile geographic zones such as in permafrost poses particular challenges. Permafrost is defined as soil that stays in a frozen state for more than two years. Cement compositions for use for in subterranean formations within zones of permafrost must be designed to set before freezing and have a low heat of hydration. In addition to destabilizing the formation, high heats of hydration promote the evolution of gas hydrates (e.g. methane hydrate) that are present in large amounts in permafrost. Gas hydrates, for example methane hydrate, are metastable and can easily dissociate.

Thus there is an ongoing need for cement compositions having a low heat of hydration.

BRIEF SUMMARY OF SOME OF THE PREFERRED EMBODIMENTS

Disclosed herein is a method of servicing a wellbore in a subterranean formation, comprising preparing a cement composition comprising water and a cementitious material, wherein the cementitious material further comprises blast furnace slag, vitrified shale, calcium sulfate hemi-hydrate or combinations thereof, and placing the cement composition in the wellbore.

Also disclosed herein is a cement composition comprising water and a cementitious material, wherein the cementitious material further comprises blast furnace slag, vitrified shale, calcium sulfate hemi-hydrate or combinations thereof.

Further disclosed herein is a cement composition comprising water and a cementitious material, wherein the cementitious material further comprises blast furnace slag.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Disclosed herein are cement compositions comprising water and a cementitious material, wherein the cementitious material further comprises blast furnace slag, vitrified shale, calcium sulfate hemi-hydrate or combinations thereof. Further disclosed herein are methods of preparing and using such compositions. Cement compositions comprising blast furnace slag, vitrified shale, calcium sulfate hemi-hydrate or combinations thereof may also be referred to herein as low heat of hydration cement compositions (LHCCs). The LHCCs disclosed herein may be employed in the servicing of a wellbore and may advantageously provide a low heat of hydration and high compressive strength within a fragile geographic region such as permafrost and/or areas containing gas hydrates.

In an embodiment, the LHCC comprises calcium sulfate hemi-hydrate also known as Plaster of Paris. Commercially available calcium sulfate hemi-hydrate also represented herein by the formula $(CaSO_4 \cdot \frac{1}{2}(H_2O))$, is a mixture of powdered and heat-treated gypsum which can be mixed with water resulting in hardening of the plaster of paris to a smooth solid that does not shrink or lose volume because it hardens before all the water can evaporate. Calcium sulfate hemi-hydrate is widely available commercially from suppliers such as U.S. Gypsum and Georgia Pacific.

In an embodiment, calcium sulfate hemi-hydrate is present in the cement composition in an amount of from about 20% to about 80% by weight of dry material (bwod), alternatively from about 45% to about 75% bwod, alternatively from about 55% to about 65% bwod.

In an embodiment, the LHCC comprises blast furnace slag (BFS). BFS appears as the upper surface layer of molten iron released from a blast furnace. The slag is separated from the iron and is considered a co-product of the production of iron and steel. BFS is a nonmetallic product consisting essentially of silicates, aluminosilicates of calcium, and other compounds that are developed in a molten condition simultaneously with the iron in the blast-furnace. BFS is widely available commercially.

In an embodiment, BFS is present in the cement composition in an amount of from about 20% to about 80% bwod, alternatively from about 45% to about 75% bwod, alternatively from about 55% to about 65% bwod.

In an embodiment, the LHCC comprises vitrified shale. Shale is a fine-grained sedimentary rock whose original constituents were clays or muds. It is characterized by thin laminae breaking with an irregular curving fracture, often splintery, and parallel to the often indistinguishable bedding planes. The shale may then be subjected to the process of vitrification followed by being ground or milled to a desired particle size. Herein vitrification refers to heating of the material to a temperature that promotes the conversion of the shale into a glass-like amorphous solid which is free of any crystalline structure. In an embodiment, the vitrified shale is present in the cement composition in an amount of from about 35% to about 65% bwod, alternatively from about 40% to about 60% bwod, alternatively from about 45% to about 55% bwod.

In an embodiment, the cementitious material of the LHCC comprises blast furnace slag and calcium sulfate hemi-hydrate in a weight ratio of from about 1:4 to about 4:1; alternatively from about 2:3 to about 3:2; alternatively from about 0.45:0.55 to about 0.55:0.45. In an embodiment, the cementitious material of the LHCC comprises blast furnace slag and vitrified shell in a weight ratio of from about 1:4 to about 4:1; alternatively from about 2:3 to about 3:2; alternatively from about 0.45:0.55 to about 0.55:0.45. In an embodiment, the cementitious material of the LHCC comprises vitrified shell and calcium sulfate hemi-hydrate in a weight ratio of from about 1:4 to about 4:1; alternatively from about 2:3 to about 3:2; alternatively from about 0.45:0.55 to about 0.55:0.45.

In various embodiments, the cementitious material of the LHCC may consist or consist essentially of blast furnace slag, vitrified shale, calcium sulfate hemi-hydrate or combinations thereof. In various embodiments, the cementitious material of the LHCC excludes material amounts of hydraulic cement, for example a cement that includes calcium, aluminum, silicon, oxygen, and/or sulfur and which sets and hardens by reaction with the water. In various embodiments, the cementitious material of the LHCC excludes material amounts of Portland cements (e.g., classes A, C, G, and H Portland cements), pozzolana cements, gypsum cements, phosphate cements, high alumina content cements, silica cements, high alkalinity cements, or combinations thereof.

In an embodiment, the LHCC includes a sufficient amount of water to form a pumpable slurry. The water may be fresh water or salt water, e.g., an unsaturated aqueous salt solution or a saturated aqueous salt solution. Examples of salt solutions that may be used include without limitation brine and seawater. The water may be present in an amount from about 20 to about 180 percent by weight of cement, alternatively from about 28 to about 60 percent by weight of cement.

In some embodiments, additives may be included in the LHCC for improving or changing the properties thereof. Examples of such additives include but are not limited to salts, accelerants, surfactants, set retarders, defoamers, settling prevention agents, weighting materials, dispersants, formation-conditioning agents, or combinations thereof. Other mechanical property modifying additives, for example, are carbon fibers, glass fibers, metal fibers, minerals fibers, and the like which can be added to further modify the mechanical properties. These additives may be included singularly or in combination. Methods for introducing these additives and their effective amounts are known to one of ordinary skill in the art.

In an embodiment, the LHCC comprises a density-reducing additive. Density-reducing additives such as hollow beads or foaming and expanding additives such as foaming surfactants gas, suspension aids, defoamers and the like may be included in the LHCC to generate a lightweight cement slurry. In some embodiments, the choice of a density-reducing additive may be dependent on the viscosity of the LHCC. In an embodiment, the LHCC is a foamed cement. Amounts of such density-reducing additives and methods for their inclusion are known to one of ordinary skill in the art. As will by understood by one of ordinary skill in the art the inclusion of a density reducing additive such as foam into the LHCCs of this disclosure may display a reduced heat of hydration due to the reduced mass per unit volume. In various embodiments, the LHCC may comprise a density greater than or equal to about 10 lb/gallon.

In some embodiments, the LHCC may comprise a retarder. Herein a retarder refers to a chemical additive used to increase the thickening time of the cement composition. The thickening time refers to the time required for the cement composition to achieve 70 Bearden units of Consistency (Bc). At about 70 Bc, the slurry undergoes a conversion from a pumpable fluid state to a non-pumpable paste. Methods for the determination of thickening time are outlined in API Specification 10B $22^{nd}$ Edition dated December 1997. Set retarders may be included by the user by methods and in amounts known to one of ordinary skill in the art. Alternatively, such retarders may be part of the commercially available formulations of other components of the disclosed LHCC. Without limitation, an example of a set retarder is sodium citrate.

The components of the LHCC may be combined in any order desired by the user to form a slurry that may then be placed into a wellbore. The components of the cement composition may be combined using any mixing device compatible with the composition, for example a bulk mixer. In an embodiment, the components of the LHCC are combined at the site of the wellbore. Alternatively, the components of the LHCC are combined off-site and then later used at the site of the wellbore. Methods for the preparation of a LHCC slurry are known to one of ordinary skill in the art.

In an embodiment, the LHCCs have a reduced heat of hydration when compared to an otherwise identical composition comprising a Portland cement. The heat of hydration of said compositions may be expressed as the maximum temperature reached upon hydration $T_{max}$. In an embodiment, 1800 grams of a LHCC has a $T_{max}$ of from about 40° C. to about 60° C. In an embodiment, the maximum heat evolved upon hydration of the cement compositions of this disclosure is from about 10 btu/lb to about 30 btu/lb.

In an embodiment, the LHCCs of this disclosure develop an appreciable compressive strength in less than about 12:00 hours when placed into a subterranean formation. Herein the compressive strength is defined as the capacity of a material to withstand axially directed pushing forces. The maximum resistance of a material to an axial force may be determined in accordance with ASTM D 2664-95a. Beyond the limit of the compressive strength, the material becomes irreversibly deformed and no longer provides structural support and/or zonal isolation. In an embodiment, the LHCCs of this disclosure develop a compressive strength of from about 300 psi to about 500 psi, alternatively from about 1500 psi to about 2000 psi.

The LHCCs disclosed herein can be used for any purpose. In an embodiment, the LHCC is used to service a wellbore that penetrates a subterranean formation. It is to be understood that "subterranean formation" encompasses both areas below exposed earth and areas below earth covered by water such as ocean or fresh water. In an embodiment, a LHCC is used to service a wellbore penetrating a fragile geographic zone, for example a wellbore in permafrost and/or a formation having gas hydrates.

Servicing a wellbore includes, without limitation, positioning the LHCC disclosed herein in the wellbore to isolate the subterranean formation from a portion of the wellbore; to support a conduit in the wellbore; and to seal an annulus between the wellbore and an expandable pipe or pipe string. The LHCC disclosed herein may withstand substantial amounts of pressure, e.g., the hydrostatic pressure of a drilling fluid or cement slurry, without being dislodged or extruded. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the LHCCs disclosed herein may be employed in well completion operations such as primary cementing operations. Said compositions may be placed into an annulus of the wellbore and allowed to set such that it isolates the subterranean formation from a different portion of the wellbore. The LHCC thus forms a barrier that prevents fluids in that subterranean formation from migrating into other subterranean formations. Within the annulus, the fluid also serves to support a conduit, e.g., casing, in the wellbore.

In other embodiments, additives are also pumped into the wellbore with the LHCCs. For instance, fluid absorbing materials, particulate materials, organophilic clay, resins, aqueous superabsorbers, viscosifying agents, suspending agents, dispersing agents, fluid loss agents, mechanical property modifying agents such as fibers, elastomers or combinations thereof can be pumped in the stream with the compositions disclosed.

EXAMPLES invention having been generally described, the following examples are given as particular embodiments of the invention and to demonstrate the practice and advantages thereof. It is understood that the examples are given by way of illustration and are not intended to limit the specification of the claims in any manner. In the following examples, heat of hydration measurements were recorded by placing a temperature recording thermocouple in an insulated silver-plated borosilicate glass vacuum flask and completely filling the flask with the slurry composition. Thickening time tests, compressive strength determinations and rheology measurements were conducted in accordance with procedures outlined in API Specification 10.

Example 1

Several slurry compositions were prepared and the maximum temperature recorded during the setting process as shown in Table 1.

TABLE 1

| Run # | Slurry Composition[1] | Water/Cement Ratio | Maximum Temperature (° C.) |
|---|---|---|---|
| 1 | slag/hemi-hydrate | 0.4 | 59 |
| 2 | slag/hemi-hydrate + 0.1% Na citrate | 0.4 | 59 |
| 3 | slag/hemi-hydrate + 0.3% Na citrate | 0.4 | 58 |
| 4 | same slurry 22% foam quality | 0.4 | |
| 5 | slag/hemi-hydrate + 0.5% Na citrate | 0.4 | 46[2] |
| 6 | Class H cement/hemi-hydrate | 0.38 | 79 |
| 7 | Class H cement/Shale | 0.52 | 60 |
| 8 | 50/50 Class H cement/Pozzolonic + 2% Gel | 0.57 | 84 |
| 9 | Class H cement/Slag | 0.45 | 98 |
| 10 | PERMAFROST low temperature cement | 0.39 | 76 |
| 11 | Class H cement | 0.38 | 100 |
| 12 | Class H cement + 5% Gel | 0.44 | 100 |
| 13 | Class H cement + Lecithin | 0.44 | 100 |

[1]All mixtures are 50/50 by weight with the exception of permafrost cement and 50/50 fly ash.
[2]At 27° C., Thickening time 5:47

Hereafter, calcium sulfate hemi-hydrate may be referred to for simplicity as hemi-hydrate and blast furnace slag as slag.

Na citrate is a set retarder that is widely commercially available. In Run 4, 22% foam quality refers to the introduction of foamed air that occupies 22% of the volume of the cement. Class H cement is an API designation referring to a class of Portland cement that may be used as a base cement from the surface down to 8000 feet (2440 m), as it is or with accelerators or retarders to cover a wide range of depths and temperatures. Fly ash is the residue from power plants which burn pulverized coal that can be mixed with lime to make a mortar that will also set under water. The gel is sodium bentonite, which is a water-swellable clay. PERMAFROST low temperature cement is a low heat of hydration cement commercially available from Halliburton Energy Services and is described in more detail in U.S. Pat. Nos. 5,346,550 and 5,447,198 each of which are incorporated herein by reference in its entirety. The results demonstrate that slurries containing blast furnace slag and calcium sulfate hemi-hydrate had the lowest heats of hydration.

Example 2

The compressive strength of several cement slurries was determined after having set for 24 hours, Table 2. Also the difference between the initial temperature of the slurry (approximately 27° C.) and the final slurry temperature ($\Delta T$) was recorded.

TABLE 2

| Slurry Composition[1] | Water/Cement Ratio | Compressive Strength (psi) | $\Delta T$ (° C.)[2] |
|---|---|---|---|
| Shale/Slag | 0.55 | 253 | — |
| Shale/Cement | 0.52 | 809 | 33 |
| Shale/Hemi-hydrate | 0.52 | 425 | — |
| Hemi-hydrate/Cement | 0.38 | 2000 | 52 |
| Hemi-hydrate/Slag | 0.4 | 1690 | 29 |
| Cement/Slag | 0.45 | 2450 | 71 |

[1]All mixtures are 50/50 by weight with the exception of permafrost cement and 50/50 pozzolonic
[2]Difference between slurry temperature after mixing and maximum temperature recorded during hydration.

Cement in Table 2 refers to Class H cement. The results demonstrate that a combination of slag and hemi-hydrate had the lowest $\Delta T$, yet developed a compressive strength of 1690 psi after 24 hours at 140° F.

Example 3

A comparison of calcium sulfate hemi-hydrate from different sources was made to determine the effects, if any, on the cement composition. In Table 3a there is a comparison of the hydration properties for U.S. Gypsum (USG) hemi-hydrate to Georgia Pacific (GP) hemi-hydrate with a 50/50 slag/hemi-hydrate and 40% water composition. Calcium sulfate hemi-hydrate from different sources contains a proprietary retarder. In Table 3b there is a comparison of the retarder response of USG hemi-hydrate and GP hemi-hydrate at 80° F. with a slurry composition of 50/50 slag/hemi-hydrate, 0.5% sodium citrate and 40% water.

TABLE 3a

| Hemi-hydrate | Maximum Temperature (° C.) | Time to maximum temperature hours:minutes |
|---|---|---|
| USG | 60.1 | 4:55 |
| GP | 59.7 | 4:36 |

TABLE 3b

| Hemi-hydrate | Thickening time hours:mins |
|---|---|
| USG | 10:22 |
| GP | 3:16 |

The results demonstrate that while the hemi-hydrate obtained from different sources (i.e U.S. Gypsum and Georgia Pacific) have similar hydration properties they have a dissimilar response to citrate retarder.

The concentration of set retarder, sodium citrate, was varied as shown in Table 4 for slurries having a 50/50 slag/hemi-hydrate and 40% water composition.

TABLE 4

| Sodium Citrate (g) | ΔT (° C.) | Time to Maximum Heat Rise hours:minutes |
|---|---|---|
| 0 | 29 | 3:50 |
| 1.6 | 30 | 5:30 |
| 4.8 | 29 | 10:20 |
| 8 | 17 | 31:30 |

The results demonstrate that increasing the sodium citrate concentration decreases the ΔT and increase the time to maximum heat rise.

Example 4

The effect of varying the water to cement ratio on the heat of hydration was determined as shown in Table 5 for a base slurry comprising 60:40 USG hemi-hydrate:slag.

TABLE 5

| Water to Cement Ratio | Maximum Temperature Recorded (° C.) |
|---|---|
| 0.40 | 61.1 |
| 0.42 | 63.1 |
| 0.44 | 62.2 |

The results demonstrate that when the hemi-hydrate to slag ratio is fixed at 60:40, the water to cement ratio can vary from 0.40 to 0.44 with no effect on the heat evolved.

Example 5

The compressive strength of three cement compositions having the indicated differing slag/hemi-hydrate ratios with 40% water were determined as shown in Table 6.

TABLE 6

| Hemi-Hydrate/Slag Ratio | Compressive Strength (psi) |
|---|---|
| 6/4 | 1950 |
| 5/5 | 1940 |
| 4/6 | 1750 |

The results demonstrate reasonable compressive strengths developed for the various slaf/hemi-hydrate ratios observed.

Example 6

The effect of a density-reducing additive on the heat of hydration was determined, as shown in Table 7.

TABLE 7

| Slurry Composition | ΔT (° C.) |
|---|---|
| 50/50 by weight Slag/Class H, 45% water | 70.7 |
| 50/50 by weight Slag/Class H, 45% water foamed to 11.35 lb/gal | 50.6 |
| Class H, 38% water | 71.2 |
| Class H, 38% water foamed to 11 lb/gal | 64.8 |
| Class H, 38% water foamed to 8.6 lb/gal | 53.3 |

The results demonstrate that when the cement is foamed there is less cement per unit volume and consequently less heat evolved while curing.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
   (a) preparing a cement composition comprising water and a cementitious material, wherein the cementitious material comprises blast furnace slag and calcium sulfate hemi-hydrate; and
   (b) placing the cement composition in the wellbore, wherein the cementitious material comprises blast furnace slag in an amount of from about 45% to about 75% by weight of the dry material, and wherein the cementitious material comprises calcium sulfate hemi-hydrate in an amount of from about 20% to about 55% by weight of the dry material.

2. The method of claim 1 wherein the maximum heat evolved upon hydration of the cement composition is from about 10 btu/lb to about 30 btu/lb.

3. The method of claim 1 wherein the cement composition has a compressive strength of from about 300 psi to about 2000 psi upon curing.

4. The method of claim 3 wherein the compressive strength develops in less than about 12 hours.

5. The method of claim 1 wherein the cement composition further comprises a set retarder.

6. The method of claim 5, wherein the set retarder comprises sodium citrate.

7. The method of claim 1 further comprising foaming the cement composition.

8. The method of claim 1 wherein the cement composition further comprises a density-reducing additive.

9. The method of claim 8 wherein the density-reducing additive comprises glass beads, gas, or combinations thereof.

10. The method of claim 1 wherein 1800 grams of the cement composition has a $T_{max}$ of from about 40° C. to about 60° C.

11. The method of claim 1 wherein the cement composition is prepared at the site of the wellbore.

12. The method of claim 1 wherein the method of servicing a wellbore comprises a well completion operation.

13. The method of claim 1 wherein the cement composition further comprises a fluid absorbing material, a particulate material, an organophilic clay, a resin, an aqueous superabsorber, a viscosifying agent, a suspending agent, a dispersing agent, a fluid loss agent, a mechanical property modifying agent, or combinations thereof.

14. The method of claim 1 wherein the cementitious material comprises (i) blast furnace slag and (ii) calcium sulfate hemi-hydrate in a ratio of from about 0.45:0.55 to about 0.55:0.45.

* * * * *